United States Patent
Erlston et al.

(10) Patent No.: US 10,267,149 B2
(45) Date of Patent: Apr. 23, 2019

(54) COMBINED ELECTRIC AND HYDRAULIC MOTOR

(71) Applicants: Lester J. Erlston, Beaverton, OR (US); Michael D. Miles, Portland, OR (US)

(72) Inventors: Lester J. Erlston, Beaverton, OR (US); Michael D. Miles, Portland, OR (US)

(*) Notice: Subject to any disclaimer, the term of this patent is extended or adjusted under 35 U.S.C. 154(b) by 457 days.

(21) Appl. No.: 14/448,650

(22) Filed: Jul. 31, 2014

(65) Prior Publication Data
US 2015/0033938 A1    Feb. 5, 2015

Related U.S. Application Data

(60) Provisional application No. 61/958,723, filed on Aug. 5, 2013.

(51) Int. Cl.
*F01B 21/04*    (2006.01)
*H02K 7/116*    (2006.01)
(Continued)

(52) U.S. Cl.
CPC ............ *F01B 21/04* (2013.01); *B60K 6/20* (2013.01); *F01B 25/00* (2013.01); *F03C 1/0403* (2013.01);
(Continued)

(58) Field of Classification Search
CPC . F01B 21/04; F04B 17/03; B60K 6/22; B60K 2006/266; Y02T 10/6282; F03C 1/0457; F03C 1/0447; F03C 1/0466
See application file for complete search history.

(56) References Cited

U.S. PATENT DOCUMENTS

| | | | | |
|---|---|---|---|---|
| 2,709,422 A | * | 5/1955 | Bray | F03C 1/0431 60/430 |
| 3,848,515 A | * | 11/1974 | Gardineer | F03C 1/02 91/184 |

(Continued)

FOREIGN PATENT DOCUMENTS

| | | |
|---|---|---|
| EP | 2154296 A1 | 2/2010 |
| EP | 2261499 A1 | 12/2010 |
| EP | 2607717 A1 | 6/2013 |

OTHER PUBLICATIONS

International Search Report and Written Opinion for International Application No. PCT/US2014/049698, dated Mar. 10, 2015, 12 pages.

*Primary Examiner* — Michael Leslie
*Assistant Examiner* — Matthew Wiblin
(74) *Attorney, Agent, or Firm* — Miller Nash Graham & Dunn LLP

(57) ABSTRACT

The invention is a combined motor that combines or integrates electric and hydraulic power producing technologies into a single compact motor by means of common or shared rotor and stator elements. The invention allows optimized power, torque, performance and energy usage in electric and electric-hybrid vehicles and offers reduced weight and lower production costs due the use of common or shared components. The combined motor's electric and hydraulic power producing elements are preferably coaxial and coplanar, permitting axial compactness and enabling efficient space utilization in the vehicle. In typical electric vehicle drive cycles disproportionately large energy losses occur during the launch acceleration and brake energy recovery modes of vehicle torque demand. The combined motor increases overall efficiency by substituting high-efficiency hydraulic torque for low-efficiency electric torque during these modes. These peak efficiency substitutions conserve battery energy (Continued)

during launch acceleration, maximizing the state of charge to extend driving range or runtime.

11 Claims, 15 Drawing Sheets

(51) Int. Cl.
| | |
|---|---|
| *H02K 7/00* | (2006.01) |
| *F01B 25/00* | (2006.01) |
| *B60K 6/20* | (2007.10) |
| *F03C 1/26* | (2006.01) |
| *F04B 17/03* | (2006.01) |
| *F03C 1/04* | (2006.01) |
| *H02K 21/16* | (2006.01) |
| *H02K 21/24* | (2006.01) |
| *E02F 9/20* | (2006.01) |

(52) U.S. Cl.
CPC .............. *F03C 1/26* (2013.01); *F04B 17/03* (2013.01); *H02K 7/00* (2013.01); *H02K 7/006* (2013.01); *H02K 7/116* (2013.01); *E02F 9/2075* (2013.01); *H02K 21/16* (2013.01); *H02K 21/24* (2013.01); *Y02T 10/641* (2013.01)

(56) References Cited

U.S. PATENT DOCUMENTS

| | | | |
|---|---|---|---|
| 4,068,560 A * | 1/1978 | Orloff | F03C 1/0409 91/36 |
| 4,663,937 A | 5/1987 | Cullin | |
| 4,753,078 A | 6/1988 | Gardner, Jr. | |
| 5,190,447 A * | 3/1993 | Schneider | F04B 17/03 417/270 |
| 5,230,402 A | 7/1993 | Clark | |
| 5,391,059 A | 2/1995 | Hallundbaek | |
| 5,769,177 A | 6/1998 | Wickman | |
| 6,311,487 B1 | 11/2001 | Ferch | |
| 6,367,572 B1 * | 4/2002 | Maletschek | B60K 17/356 180/243 |
| 6,454,033 B1 | 9/2002 | Nathan | |
| 6,494,127 B1 * | 12/2002 | Cunningham | F03C 1/0428 417/273 |
| 6,552,460 B2 | 4/2003 | Bales | |
| 6,834,737 B2 | 12/2004 | Bloxham | |
| 6,930,433 B2 | 8/2005 | Bales | |
| 7,182,583 B2 * | 2/2007 | Gandrud | F04B 1/14 310/62 |
| 7,201,095 B2 | 4/2007 | Hughey | |
| 7,225,721 B2 | 6/2007 | Lemaire | |
| 7,432,623 B2 | 10/2008 | Ritz | |
| 7,689,341 B2 | 3/2010 | Miller | |
| 7,841,432 B2 * | 11/2010 | Lynn | B60K 6/12 180/301 |
| 7,863,784 B2 | 1/2011 | Ritz | |
| 2005/0287015 A1 * | 12/2005 | Lemaire | F03C 1/0409 417/273 |
| 2009/0309463 A1 | 12/2009 | Ritz, Jr. et al. | |
| 2009/0317266 A1 * | 12/2009 | Rampen | F03C 1/0447 417/53 |
| 2011/0320074 A1 * | 12/2011 | Erlston | B60K 6/26 701/22 |
| 2013/0180247 A1 * | 7/2013 | Yamada | B60K 6/20 60/706 |
| 2014/0051537 A1 * | 2/2014 | Liu | F16H 3/72 475/5 |

* cited by examiner

COMBINED ELECTRIC AND HYDRAULIC MOTOR

CROSS REFERENCE TO RELATED APPLICATIONS

This application claims the benefit of U.S. provisional patent application Ser. No. 61/958,723, filed Aug. 5, 2013, herein incorporated by reference.

FIELD OF THE INVENTION

This invention relates to a motor that combines electric and hydraulic power producing features in a single device.

BACKGROUND OF THE INVENTION

A hybrid vehicle uses two distinct power sources to propel the vehicle, typically either an electric system or an hydraulic system to supplement an internal combustion engine in order to reduce its fuel consumption. There are appropriate applications for both electric and hydraulic hybrid systems, the value proposition and peak efficiency for each system depending on the vehicle duty cycle.

Hydraulic hybrids have much higher power capability, but for shorter periods, and typically regenerate more kinetic energy during braking than electric hybrid systems, which typically have greater energy storage capacity, but produce less power. Hydraulic hybrid systems typically recover up to 75% of the vehicle's kinetic energy compared to 25% for electric hybrids, and are capable of faster, more efficient energy charge and discharge than battery systems.

A problem, however, in hybrid vehicles is the need for the alternative mode of propulsion to provide the diverse requirements of optimum power and torque, particularly during acceleration, maximum driving range and maximum energy regeneration during braking. To try to solve this problem many patents have been filed disclosing various combinations and configurations for employing both hydraulic and electric systems in a vehicle to obtain the optimum performance characteristics of each system. A solution to the problem may also have applications in electric vehicles as a battery range extender.

The objective of the invention is a combined motor for use as a primary or supplementary motor in electric and electric hybrid vehicle applications with the capability to provide, in both propulsion and energy recovery modes, optimized performance and efficiency over the vehicle's duty cycle, and offering weight, space, cost and production efficiencies.

PRIOR ART

The following US patents, and many patents citing or referenced by these patents, acknowledge the utility of employing both electric and hydraulic motors in hybrid and electric vehicle applications, often by joining or locating both motors on a single shaft. None, however, creates a combined motor that integrates, combines or couples the major functional components of both motor types to reduce component count, weight, size and cost.

U.S. Pat. No. 7,841,432 Lynn (Hydro-electric hybrid drive system for motor vehicle)
U.S. Pat. No. 7,689,341 Miller (Prioritized recapture of energy during deceleration of a dual-hybrid motor vehicle)
U.S. Pat. No. 7,201,095 Hughey (Vehicle system to recapture kinetic energy)
U.S. Pat. No. 7,024,964 Fukuchi (Hydraulic drive device utilizing electric motor)
U.S. Pat. No. 6,834,737 Bloxham (Hybrid vehicle and energy storage system)
U.S. Pat. No. 6,454,033 Nathan (Electro-hydraulic vehicle with energy regeneration)
U.S. Pat. No. 6,311,487 Ferch (Electromechanical hydraulic drive system for vehicle)
U.S. Pat. No. 5,769,177 Wickman (Hydro electric vehicle drive system)
U.S. Pat. No. 5,230,402 Clark (Electric-hydraulic car)
U.S. Pat. No. 4,753,078 Gardner, Jr. (Electrohydraulic vehicle drive system)
U.S. Pat. No. 4,663,937 Cullin (Electro-mechanical-hydraulic power generating system)

The following US patents, and many patents citing or referenced by these patents, disclose features and functions relating to the radial piston ring cam hydraulic motor, which is the preferred hydraulic motor subsystem in the combined motor invention.

U.S. Pat. No. 7,225,721 Lemaire (Hydraulic motor)
U.S. Pat. No. 6,494,127 Cunningham (Radial piston engine with guide rollers)
U.S. Pat. No. 5,391,059 Hallundbaek (Radial piston motor or pump)

SUMMARY OF THE INVENTION

This invention relates to a combined motor that combines, couples or integrates two distinct motor technologies, electric and hydraulic, into a single motor device through the use of common or shared rotor and stator elements. The invention allows optimized power, torque, performance and energy usage in electric and electric-hybrid vehicles and offers reduced weight, size and part count and lower production costs due to the use of common or shared components. A common cooling system may also be shared by the electric and hydraulic power producing elements of the combined motor. The combined motor's electric and hydraulic power producing elements are preferably coaxial and coplanar, permitting axial compactness and enabling efficient space utilization in the vehicle. In certain embodiments of the invention the hydraulic rotor and electric rotor elements of the respective hydraulic and electric motors may be independently rotatable, and stacked configurations, where the hydraulic and electric power producing elements are not coplanar, may be preferable.

The invention may have a variety of embodiments, with the hydraulic motor and electric motor subsystems configured in parallel or in series arrangements. In a parallel configuration a preferred embodiment locates the hydraulic motor elements concentrically within a large diameter electric ring or pancake motor. Alternatively the electric ring or pancake motor may be concentrically located within the hydraulic motor. In a series configuration there are two arrangements: the electric motor housing may be stationary and its rotor is fixed to and drives the housing of the hydraulic motor. Alternatively the hydraulic motor housing may be stationary and the hydraulic rotor is fixed to and drives the electric motor housing. In both arrangements either or both of the motors may be energized to provide a combined shaft output. The speed of the output shaft is the sum of the two motor speeds. This series arrangement also permits one motor to drive the other such that the driven device becomes a generator or pump depending on which is the driven device.

Large diameter electric motors, in particular brushless permanent magnet motor designs that locate both rotor magnets and stator core and windings towards the outside or perimeter of the motor and leave an open center section, such as but not limited to ring and pancake type motors of the type manufactured by Applimotion, Inc. of Loomis, Calif., USA, and those disclosed in U.S. Pat. Nos. 6,552,460; 6,930,433; 7,432,623 and 7,863,784, are particularly well-suited to the invention because hydraulic motors of circular or pancake format, such as but not limited to, ring cam, gerotor, gear and vane motors, may be integrated, combined or coupled within the open center section of the aforementioned large diameter electric ring or pancake motors.

The blending of electric and hydraulic technologies allows each to be optimized for its respective speed and torque demands while sharing components and minimizing the physical volume and cost. Such a configuration has not previously been implemented to provide a range of complementary power availability and efficiency for propulsion and energy recovery in a compact device, the power being transmitted to the vehicle as high torque at low speeds. A system controller coordinates torque share and energy usage between the electric and hydraulic subsystems to maximize energy efficiency.

In typical electric vehicle drive cycles disproportionately large energy losses occur during the launch acceleration and brake energy recovery modes of vehicle torque demand. The combined motor increases overall efficiency by substituting high-efficiency hydraulic torque for low-efficiency electric torque during these modes. These peak efficiency substitutions conserve battery energy during launch acceleration, maximizing the state of charge for extended driving range or runtime.

The invention is designed to deliver the most efficient use of battery energy by substituting high-efficiency hydraulic energy for electric energy at inefficient electric motor speeds during launch acceleration and brake energy recovery events. The energy efficiency gains result in energy conservation for added range or runtime in a specific drive cycle or period of use, or alternatively, enable a reduction in battery size or capacity for such drive cycle.

Electric motors utilize energy inefficiently to produce torque from zero to low motor speeds due to heat losses generated in the windings, but are highly efficient at higher speeds. Hydraulic motors are exceptionally efficient at low speeds and deliver up to 3× the launch acceleration efficiency of electric motors at lower speeds. Similarly, their energy recovery efficiency is very high during deceleration from moderate speeds. By utilizing high efficiency hydraulic torque instead of low efficiency electric torque at low speeds the combined motor reduces demand on the battery, conserving energy for driving range.

The motor is scalable for a broad range of electric and electric hybrid vehicles and enables optimum energy use and regeneration in frequent start-and-stop drive cycles to maximize battery driving range or runtime and/or to reduce battery size. This would positively impact electric vehicle usability, and reduce production and operating costs.

A preferred embodiment of the combined motor comprises a large diameter electric ring motor surrounding and integrated with an hydraulic radial piston ring cam motor, with a common stator that combines the electromagnetic core and windings of the electric ring motor with the hydraulic motor hub (which includes the radial piston array and a system of valves and fluid passages that enable its hydraulic power and pumping functionality), and a common rotor comprising the permanent magnets and back iron ring of the electric ring motor affixed to or integral with the ring cam of the hydraulic motor, the rotor assembly rotatably located on the stator assembly by bearings. This embodiment produces a large diameter combined electric and hydraulic motor device that is coaxial, coplanar and axially compact. In another preferred embodiment the electric motor and hydraulic motor subsystems are arranged coaxially and coplanar to each other, having a common stator assembly but having independently rotating electric and hydraulic rotors so that the electric motor rotor can rotate at a different rotational speed at either fixed or variable rates from the hydraulic motor rotor. In certain embodiments of the invention a stacked configuration, where the hydraulic and electric power producing elements are not coplanar, may be preferable.

Applications of the Invention

The combined electric and hydraulic motor enables a significantly broader efficiency range than electric or hydraulic motors can provide on their own. In Electric Vehicle (EV), Hybrid Electric Vehicle (HEV) and Plug-in Hybrid Electric Vehicle (PHEV) applications the hydraulic component of the combined motor can recover kinetic energy and reuse it as an acceleration or launch assist significantly more efficiently than the electric component, thereby conserving battery energy and extending a vehicle's electric operating range or runtime or achieve the same range or runtime using a smaller battery.

In EV and series HEV applications the combined motor would be the main propulsion motor, with its primary purpose as battery range extender, while in parallel HEV applications the combined motor will supplement or replace the internal combustion engine (ICE) during acceleration or launch, reducing load on the ICE and lowering fuel consumption.

The efficacy of the combined motor may be optimized by incorporating it within an EV or PHEV system that includes an electric motor controller, a battery with its related management system, an hydraulic energy storage system including an accumulator, reservoir and valve control block, and an overall system controller which harmonizes and optimizes all the components to maximize vehicle range and minimize plug-in electricity cost.

Other non-vehicle applications of the combined motor are those which have a high initial torque requirement to overcome high system inertia, and which start and stop frequently. Installations such as winches, elevators, sawmill equipment, manufacturing tools, and other devices which typically employ electric motors are viable candidates for combined motors.

An implementation of the combined motor invention in a vehicle will typically comprise the following components or subsystems:
  the combined motor;
  an electric motor drive controller;
  an hydraulic valve controller;
  an electric energy storage device such as a battery or supercapacitor;
  a battery management system;
  a high pressure hydraulic energy storage device such as an accumulator;
  a low pressure hydraulic fluid reservoir;
  an hydraulic valve control block;
  a cooling system to maintain system temperature requirements;

a system, or executive, controller.

The system controller harmonizes and optimizes all the components and subsystems to maximize vehicle range and minimize electricity energy consumption. The controller must have sufficient sensor and control system responsiveness to allow it to balance the combined motor's electric and hydraulic power producing elements in a smooth manner, typically seen as hysteresis in the feedback loops, to maximize electric and hydraulic efficiency contribution and to enable safe, seamless transition between energy sources. Under predetermined conditions the controller may isolate or manage the combined motor to operate in a fail-safe mode.

The controller may include sophisticated control algorithms or simple PID (proportional integral derivative) control approaches. For certain applications, particularly integrated original equipment manufacturer ("OEM") vehicle applications, the controller will interface with key vehicle subsystems via CANbus or other onboard systems and sensors to acquire vehicle information or to provide information regarding the state of the combined motor system.

A preferred embodiment of the invention comprises a large diameter electric ring motor surrounding and integrated with an hydraulic radial piston ring cam motor. This produces a combined hydraulic and electric motor that is coaxial and coplanar, making it axially compact and of large effective diameter. Large effective diameter is achieved by locating the torque producing features of the motor at the maximum possible radius, or as close as practicable to the motor's perimeter, and offers efficiency, torque, cooling and packaging benefits to both electric and hydraulic motors. The integrated architecture of the combined motor allows cooling features in the electromagnetic stator core, such as channels and passages, in which the hydraulic fluid used to operate the hydraulic motor may be circulated to cool the stator core and windings.

A large diameter, low height combined motor may be mounted or installed in a vehicle driveline by a right angle gearbox, as disclosed in US Patent Application "Kinetic Energy Recovery and Electric Drive for Vehicles" U.S. patent application Ser. No. 12/808,664, now U.S. Pat. No. 8,798,828, whereby the combined motor is mounted in the vehicle chassis or frame with the combined motor shaft in a substantially vertical orientation and perpendicular to the vehicle driveshaft. The right angle gearbox, which comprises at least one right angle gearset, may include, but not limited to, a differential, ring and pinion, helical and bevel gearsets, transfers the vertical combined motor drive to the vehicle's horizontal driveshaft or axle. A major advantage of a low height combined motor is that its "flatness" and "thinness" permits it to be mounted low in the vehicle chassis, enabling a low vehicle center of gravity, yet not significantly encroach on the vehicle's ground clearance and interior or storage space.

The invention may be used in hub-mounted, in-wheel applications and for inboard or outboard on-axle applications, where the combined motor's axial compactness and "flatness" may be of advantage.

BRIEF DESCRIPTION OF THE DRAWINGS

Illustrative embodiments of the invention are represented with reference to the figures. Components with similar functions are designated in the figures with the same reference symbols.

In FIG. 9A the electric motor subsystem is of the ring motor design, in FIG. 9B the electric motor subsystem is not of the ring motor design and not configurable to surround the hydraulic motor subsystem.

DETAILED DESCRIPTION OF PREFERRED EMBODIMENTS

The preferred embodiments of the present invention will now be described with the reference to accompanying drawings.

In the preferred embodiments, to maximize both hydraulic and electric torque and to minimize overall axial length, torque producing features, i.e. the hydraulic ring cam-to-piston interface and the electromagnet-permanent magnets interface, are located as close to the perimeter of the combined motor as possible to maximize the radius at which force is applied. In practice, therefore, to obtain the maximum effective torque radius for the equivalent total motor diameter the electric ring motor must be located concentrically around the hydraulic ring cam motor, rather than the hydraulic motor around the electric motor.

Figure 1A:
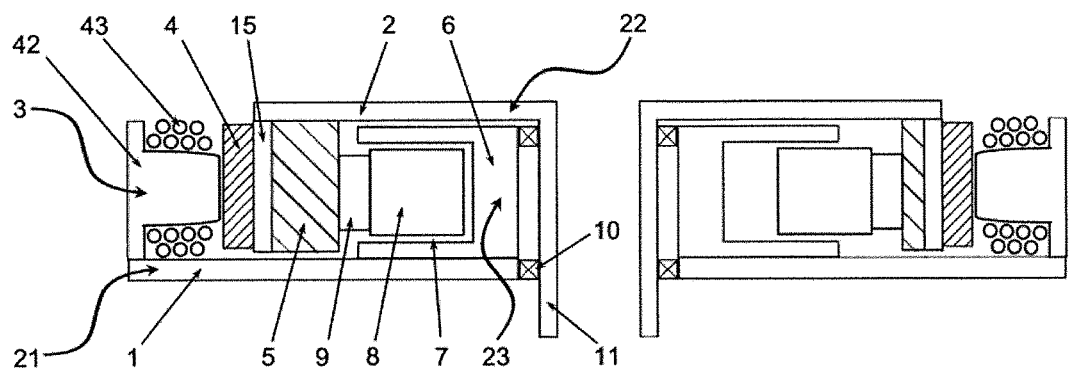
FIGS. 1A and 1B are, respectively, cross-sectional side and plan views that schematically illustrate a combined electric and hydraulic motor comprising an hydraulic radial piston ring cam motor located concentrically within, and coplanar with, an electric ring or pancake motor.
Figure 1B:
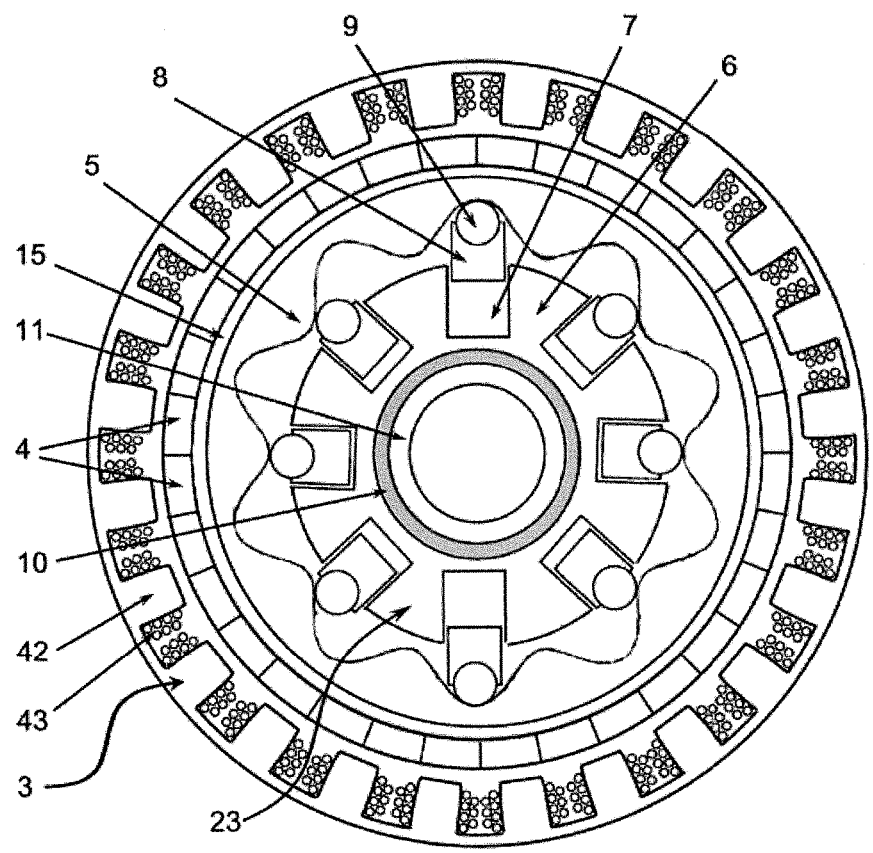

In a first exemplary embodiment of the invention FIGS. 1A and 1B are cross-sectional side and plan views that schematically illustrate a combined electric and hydraulic motor that comprises an hydraulic radial piston ring cam motor located concentrically within, and coplanar with, an electric ring or pancake motor.

Stator assembly 21 comprises stator structure 1 to which is affixed hydraulic motor hub assembly 23 and stator assembly 3 that comprises stator core 42 and coil windings 43. Hydraulic motor hub assembly 23 comprises hydraulic motor hub 6 that includes a radial array of cylinders 7 in which are located pistons 8 each of which is fitted with roller 9. Pistons 8 are pressurized to push outwardly so that rollers 9 rollingly engage convoluted, multiple-lobed inner surface of ring cam 5 to actuate pistons 8 within cylinders 7.

Hydraulic motor hub assembly 23 also includes a system of valves and hydraulic fluid passages, not shown, that enable its hydraulic power and pumping functionality.

Rotor assembly 22 comprises rotor structure 2 to which is affixed ring cam 5. Back iron ring 15 is affixed to the outer surface of ring cam 5. An array of permanent magnets 4 that electromagnetically engages with stator assembly 3, which comprises stator core 42 and coil windings 43, is affixed to back iron ring 15. If ring cam 5 is made from appropriate ferrous metal then permanent magnets 4 can be affixed directly to ring cam 5 and back iron ring 15 would not be required. Motor shaft 11 is affixed to rotor structure 2. Rotor assembly 22 is rotatably mounted to stator assembly 21 by bearings 10. In FIG. 1B stator structure 1 is not shown to permit the illustration of the internal components.

Hydraulic motors are limited in their rotational speeds due to fluid flow constraints. Beyond specific rotational speeds they stop producing torque and become non-operational. Electric motors are capable of far higher rotational speeds than hydraulic motors. Because certain embodiments of the combined motor combine or integrate elements of the hydraulic subsystem with elements of the electric subsystem the rotational speed of the electric motor subsystem, and indeed the combined motor, will be limited by the maximum rotational speed of the hydraulic subsystem unless the hydraulic motor subsystem can be uncoupled or disengaged from the electric motor subsystem at a specific rotational speed or speed range.

A feature of the radial piston ring cam hydraulic motor is its ability to be disengaged from torque production above a predetermined rotational speed and to be engaged for torque production below a predetermined rotational speed. In one embodiment, the disengage and engage functionality is achieved by creating a pressure differential, by the use of control valves, between the pressures in the area above and below the pistons.

The disengagement function pushes pistons 8 into their cylinders 7 so that rollers 9 located on top of pistons 8 are not in pressurized rolling contact with convoluted, multiple-lobed inner surface of ring cam 5. Pistons 8 are pushed into cylinders 7 by the use of control valves, not shown, that increase the pressure in the area above array of pistons 8 while relieving pressure in area below pistons 8, causing pistons 8 to retract within cylinders 7. Once convoluted, multiple-lobed inner surface of ring cam 5 is not in contact with the resistive force of pistons 8 it is free to rotate at the speed of the electric motor subsystem. Re-engagement of the rollers to make pressurized rolling contact with convoluted, multiple-lobed inner surface of ring cam 5 is effected by relieving pressure in the area above array of pistons 8 while increasing pressure in the area below pistons 8, pushing pistons 8 outwards in cylinders 7.

Figure 1C:
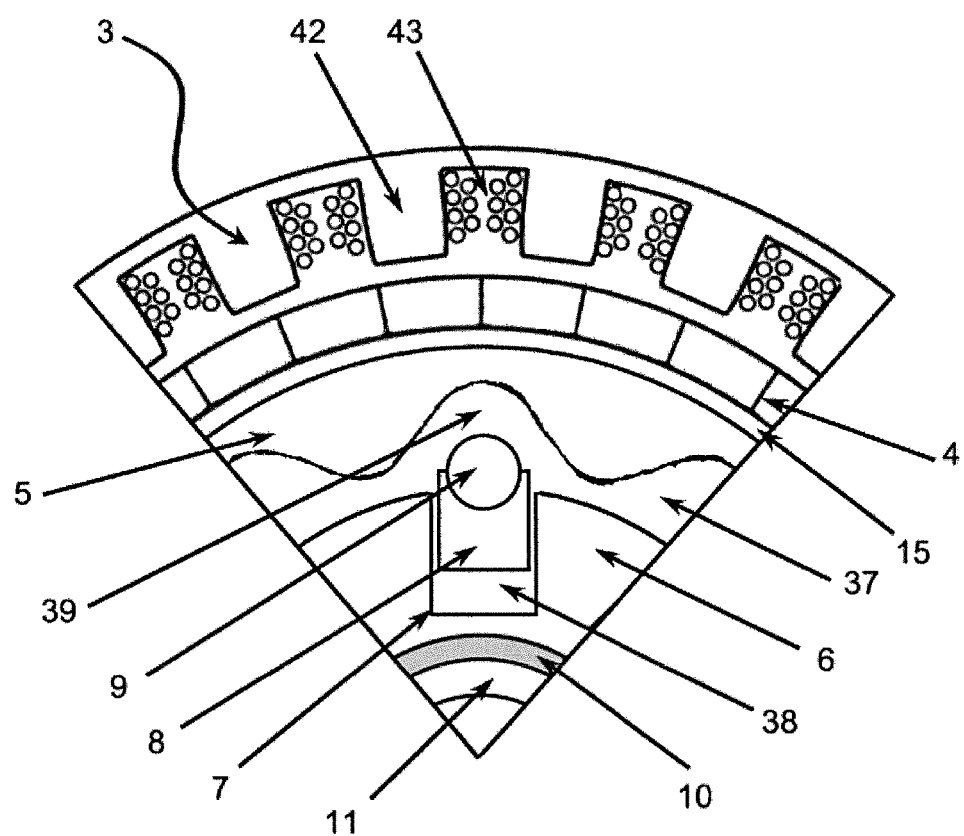
FIG. 1C is an enlarged view of the combined motor as illustrated in FIG. 1B showing a piston in retracted mode, pushed into the cylinder by pressure so that the roller located on top of the piston is not in rolling contact with the convoluted multiple-lobed internal face of the ring cam.

FIG. 1C schematically illustrates an enlarged sectional view of the combined motor as illustrated in FIG. 1B showing pistons 8 in retracted mode, pushed into cylinders 7 by pressure so that rollers 9 located on top of pistons 8 are not in rolling contact with the convoluted inner surface of ring cam 5 to create a space 39 between roller 9 and convoluted inner surface of ring cam 5. The disengagement from rolling contact is actuated by the use of control valves to increase the pressure in area 37 above array of pistons 8 while relieving pressure in area 38 below pistons 8, causing pistons 8 to retract within cylinders 7. Re-engagement of rollers 9 to make rolling contact with the convoluted inner surface of ring cam 5 is effected by relieving pressure in area 37 above array of pistons 8 while increasing pressure in area 38 below pistons 8.

Figure 2A:
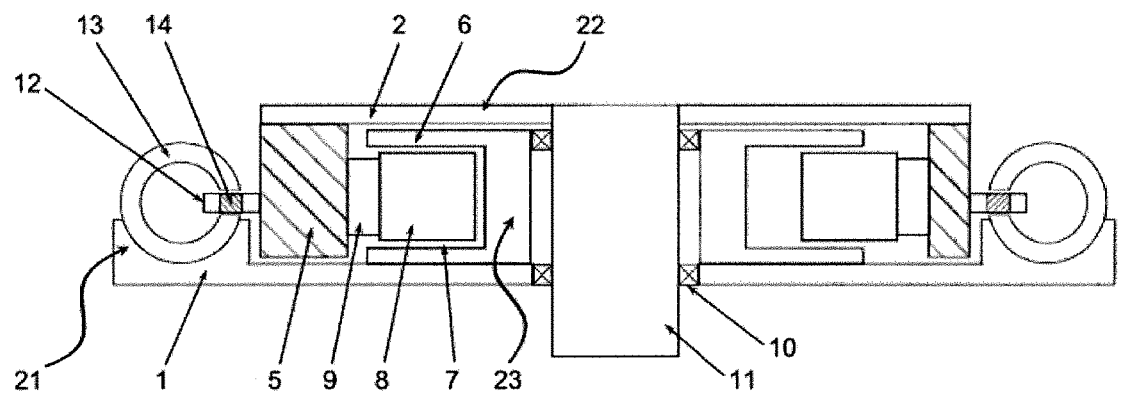
FIGS. 2A and 2B are, respectively, cross-sectional side and plan views that schematically illustrate a combined electric and hydraulic motor comprising an hydraulic radial piston ring cam motor located concentrically within, and coplanar with, an electric axial flux ring motor of the types disclosed in U.S. Pat. Nos. 6,552,460; 6,930,433; 7,432,623 and 7,863,784.
Figure 2B:
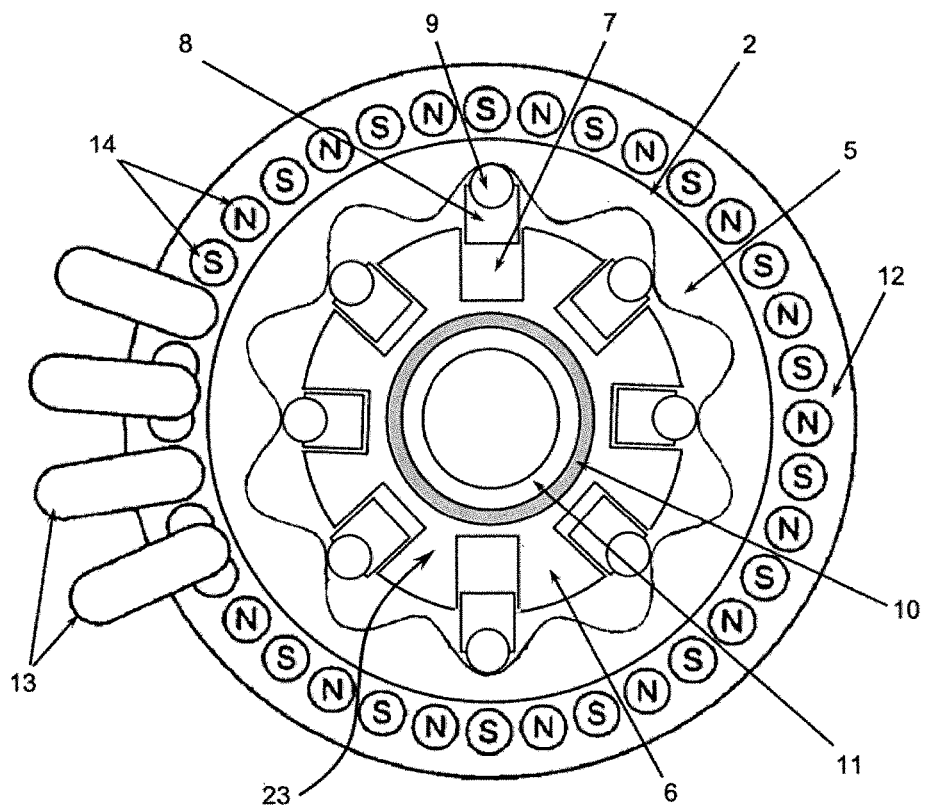

In a second exemplary embodiment of the invention FIGS. 2A and 2B are cross-sectional side and plan views that schematically illustrate a combined electric and hydraulic motor comprising an hydraulic radial piston ring cam motor located concentrically within, and coplanar with, an electric axial flux ring motor of the types disclosed in U.S. Pat. Nos. 6,552,460; 6,930,433; 7,432,623 and 7,863,784.

Stator assembly 21 comprises stator structure 1 to which is affixed an array of equally spaced toroid-shaped electromagnetic cores 13, each core 13 including coils or windings (not shown), and hydraulic motor hub assembly 23. Hydraulic motor hub assembly 23 comprises hydraulic motor hub 6 that includes radial array of cylinders 7 in which are located pistons 8 each fitted with roller 9 that rollingly engages with convoluted inner surface of ring cam 5 to actuate pistons 8 within cylinders 7. Hydraulic motor hub assembly 23 also includes a system of valves and hydraulic fluid passages, not shown, that enable its hydraulic power and pumping functionality.

Rotor assembly 22 comprises rotor structure 2 to which is affixed ring cam 5. Rotor flange 12 is affixed or integral to rotor structure 2. Rotor flange 12 is made of non-ferrous material and may be affixed directly to the outer surface of ring cam 5. An array of equally spaced permanent magnets of alternating polarity 14 that electromagnetically engages with toroidal cores and windings 13 is located on rotor flange 12. Motor shaft 11 is affixed to rotor structure 2. Rotor assembly 22 is rotatably mounted to stator assembly 21 by bearings 10. In FIG. 2B stator structure 1 is not shown to permit the illustration of the internal components.

In operation, consistent with conventional configurations of radial piston ring cam motors, when an operating fluid is inserted under pressure into the void of cylinders 7 pistons 8 are forced outward radially and rollers 9 act with a combined radial and tangential force against the convoluted multiple cam lobes of ring cam 5 to impart a resulting rotational force causing hub assembly 23, along with rotor assembly 22 to which it is integrated or affixed, to rotate relative to stator assembly 21.

Figure 3:
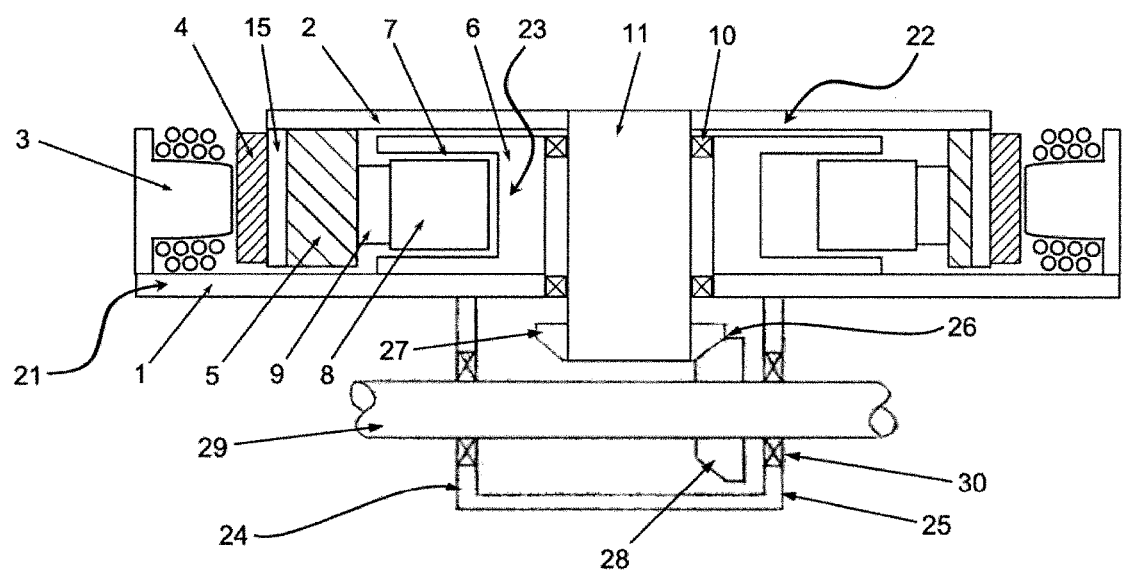
FIG. 3 schematically illustrates an embodiment of the invention in which a combined motor is integrated, joined, combined or coupled with a right angle gearbox.

FIG. 3 illustrates an embodiment of the invention in which a combined motor similar to that illustrated in FIGS. 1A and 1B is integrated, joined, combined or coupled with right angle gearbox assembly 24 so that drive from vertical motor shaft 11 may be transmitted to horizontal gearbox shaft 29. Gearbox shaft 29 may be connected to or integral with the driveshaft or drive axle of a vehicle such as an automobile, truck, bus or rail vehicle (not shown).

Stator assembly 21 comprises stator structure 1, hydraulic motor hub assembly 23 and stator assembly 3, which comprises stator core 42 and coil windings 43. Hydraulic motor hub assembly 23 comprises hydraulic motor hub 6 that includes radial array of cylinders 7 in which are located pistons 8 each of which is fitted with roller 9 that rollingly engages with the convoluted multiple-lobed inner surface of ring cam 5 to actuate the pistons within the cylinders. Hydraulic motor hub assembly 23 also includes a system of valves and hydraulic fluid passages, not shown, that enable its hydraulic power and pumping functionality.

Rotor assembly 22 comprises rotor structure 2 to which is affixed ring cam 5. Back iron ring 15 is affixed to the outer surface of ring cam 5. An array of permanent magnets 4 that electromagnetically engages with stator core 42 and windings 43 is affixed to back iron ring 15. If ring cam 5 is manufactured from appropriate ferrous metal then permanent magnets 4 can be affixed directly to ring cam 5 and back iron ring 15 would not be required. Motor shaft 11 is affixed to rotor structure 2. Rotor assembly 22 is rotatably mounted to stator assembly 21 by bearings 10.

Right angle (90 degrees) gearbox housing 25 is integrated, joined, coupled or combined with stator structure 1. Gearbox housing 25 contains right angle gearset 26 comprising bevel gear 27 and bevel gear 28. Bevel gear 27 is affixed to vertical motor shaft 11 which is journaled in bearings 10 and bevel gear 28 is affixed to horizontal gearbox shaft 29 which is journaled in bearings 30.

Figure 4A:
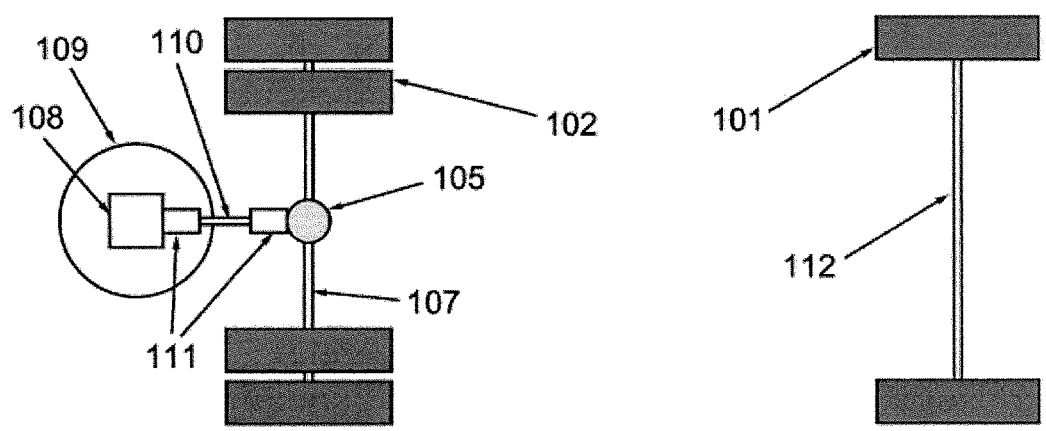
FIGS. 4A and 4B are, respectively, schematic underside and side views of the embodiment depicted in FIG. 3 mounted in a rear powered transit bus which is fitted with a combined motor as the primary propulsion motor.
Figure 4B:
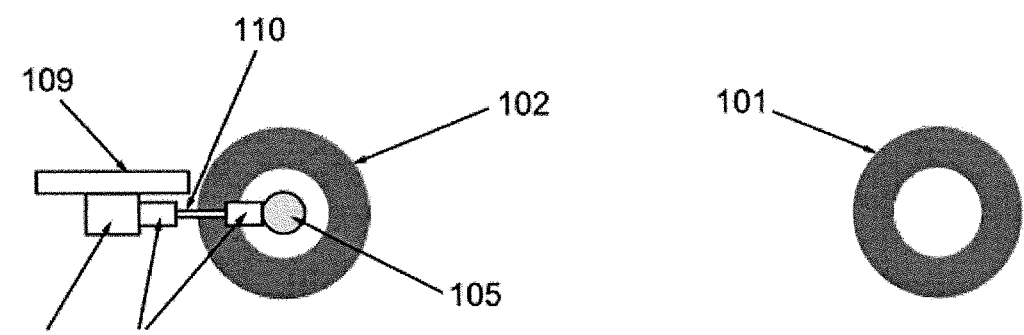
Figure 4C:
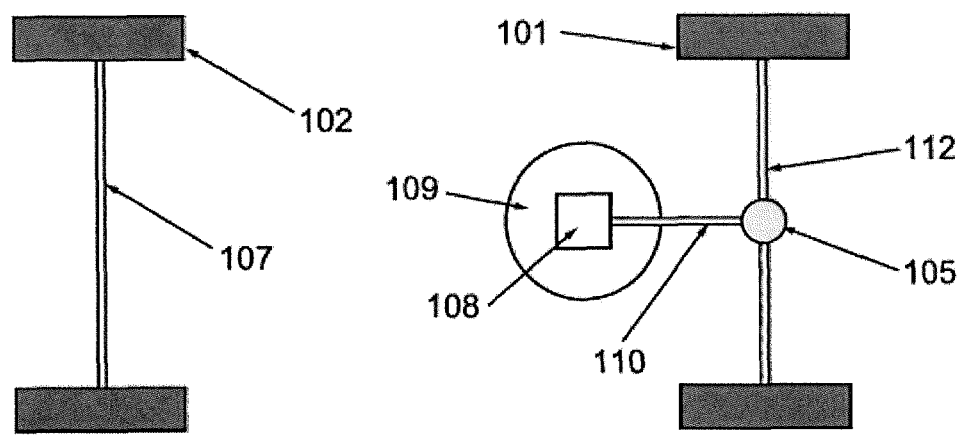
FIGS. 4C and 4D are, respectively, schematic underside and side views of the embodiment depicted in FIG. 3, mounted in a front axle powered forklift vehicle which is fitted with a combined motor as the primary propulsion motor.
Figure 4D:
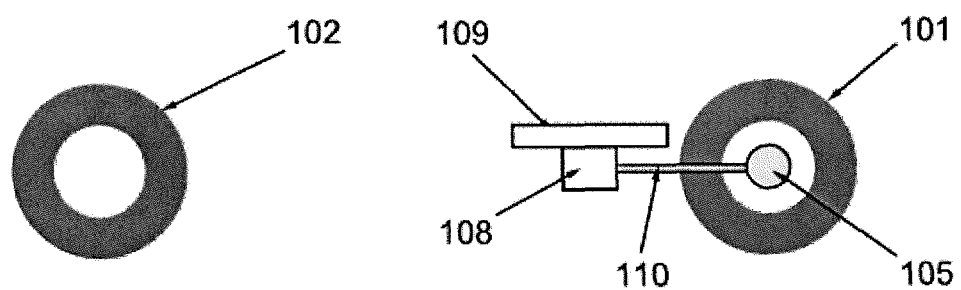

FIGS. 4A and 4B are, respectively, schematic underside and side views of the embodiment depicted in FIG. 3 mounted in a rear powered transit bus which is fitted with a combined motor as the primary propulsion motor. Combined motor 109 is affixed to right angle gearbox 108. The bus chassis is fitted with front wheels 101 and rear wheels 102. Right angle gearbox 108 is combined with combined motor 109. Gearbox shaft 110 transmits drive from right angle gearbox 108 to differential 105 via universal joints 111. Rear axle 107 transmits the drive from differential 105 to rear wheels 102.

Figure 5A:
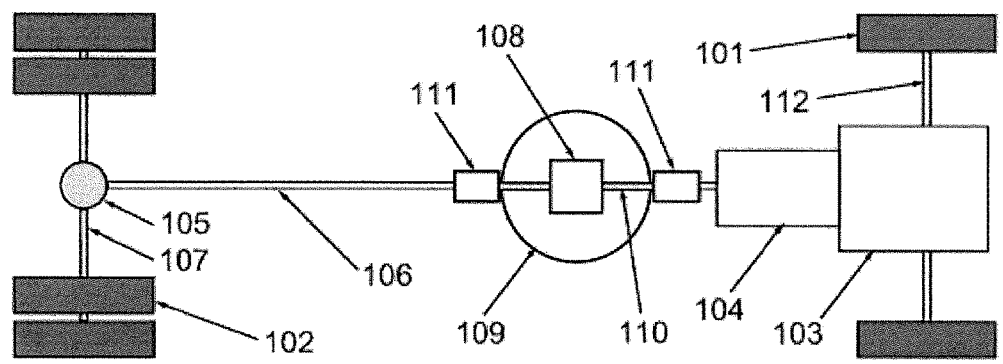
FIGS. 5A and 5B are, respectively, schematic underside and side views of the embodiment depicted in FIG. 3 mounted in a front powered internal combustion engine truck chassis, with the combined motor as a hybrid supplement to the internal combustion engine.
Figure 5B:
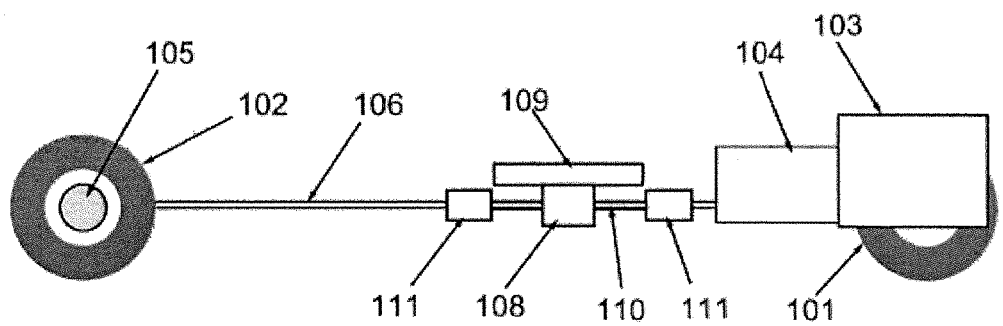

FIGS. 5A and 5B are, respectively, schematic underside and side views of the embodiment depicted in FIG. 3 mounted in a front powered internal combustion engine truck chassis, with the combined motor as a hybrid supplement to the internal combustion engine. The truck chassis is fitted with front wheels 101 and rear wheels 102. Internal combustion engine 103 transmits power via transmission 104 to differential 105 via drive shaft 106. Rear axle 107 takes the drive from differential 105 to rear wheels 102. Right angle gearbox 108 is affixed to combined motor 109. Gearbox shaft 110 passes through right angle gearbox 108 and connects with driveshaft 106 via universal joints 111.

Figure 6:
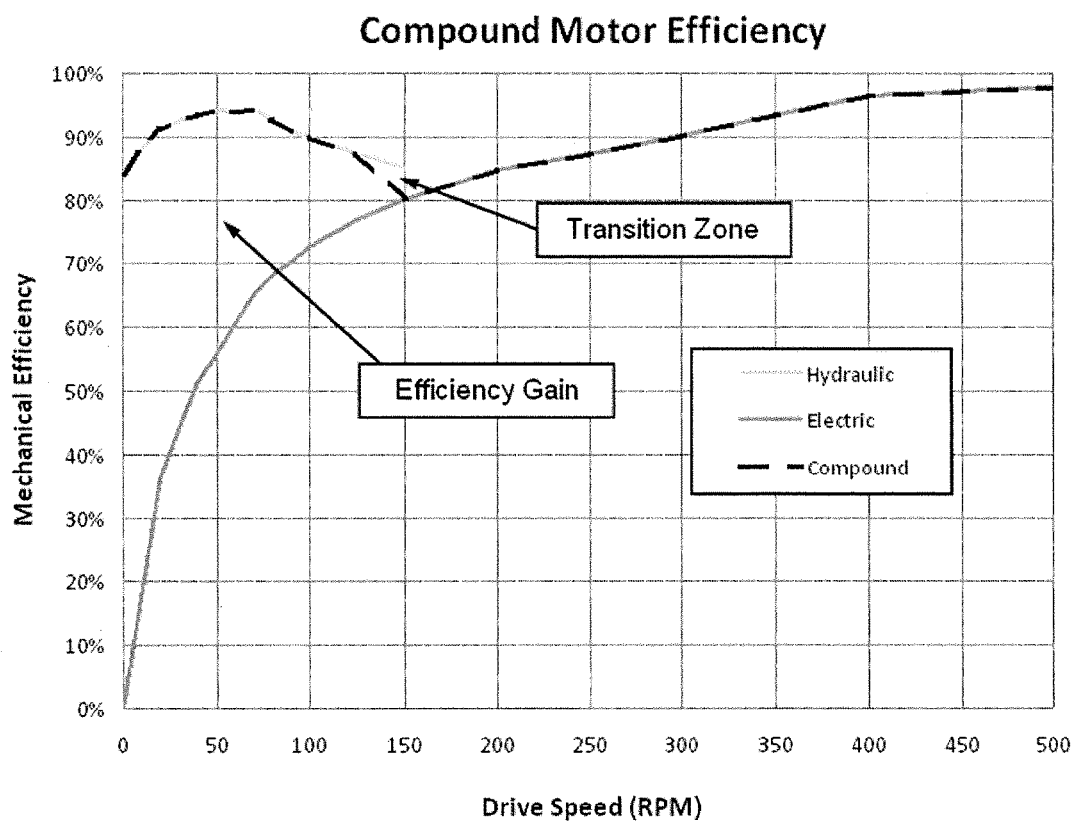
FIGS. 6, 7 and 8 are charts showing, respectively, in an electric city bus application, the combined efficiencies of both hydraulic and electric energy and the efficiency gained of the new motor; a comparison of the Net Energy Demand of the combined motor and that of electric motor of similar power; and a standardized drive cycle showing the efficiency improvement of a city bus powered by a combined motor over a similar bus powered by a conventional electric motor.

FIG. 6 is a chart showing the combined efficiencies of both hydraulic and electric energy, and the efficiency gained, in electric city bus applications. The transition from one energy source to the other, depicted by the transition zone, is managed by control software to optimize system efficiency. The electric motor efficiency curve is supplemented by the hydraulic motor efficiency curve, while the dashed line represents the combined total efficiency of the new motor.

Figure 7:
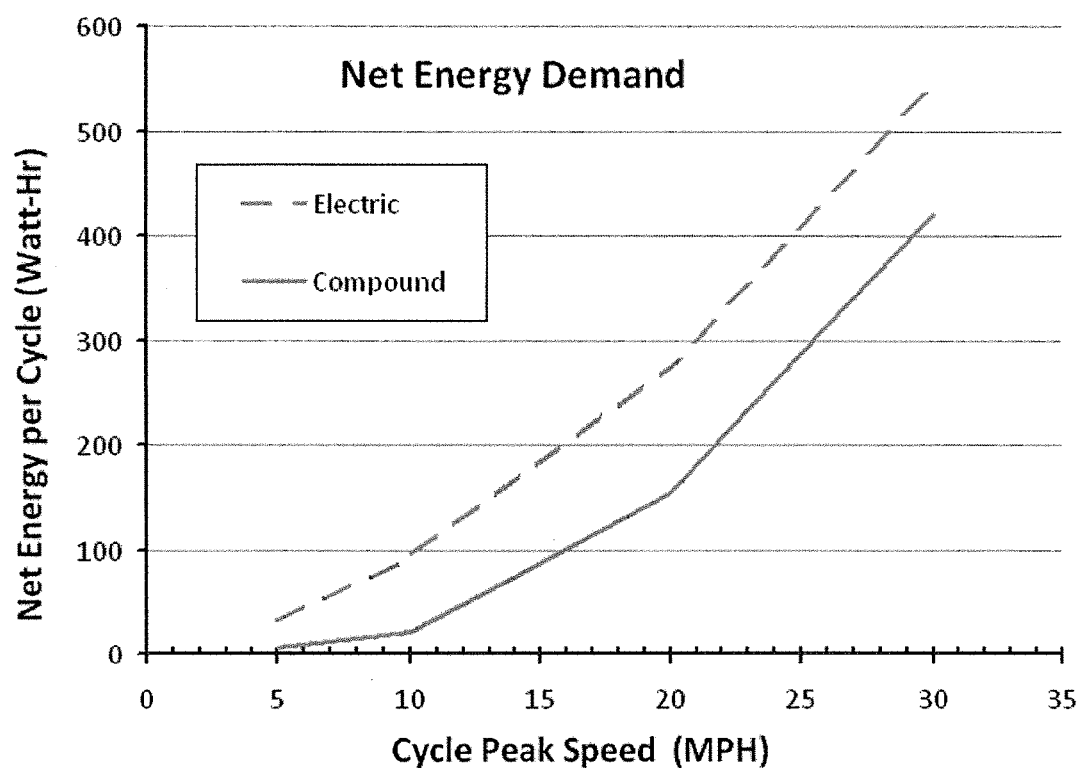

FIG. 7 is a chart comparing the Net Energy Demand of the combined motor to that of an electric motor of similar power in an electric city bus application.

Figure 8:
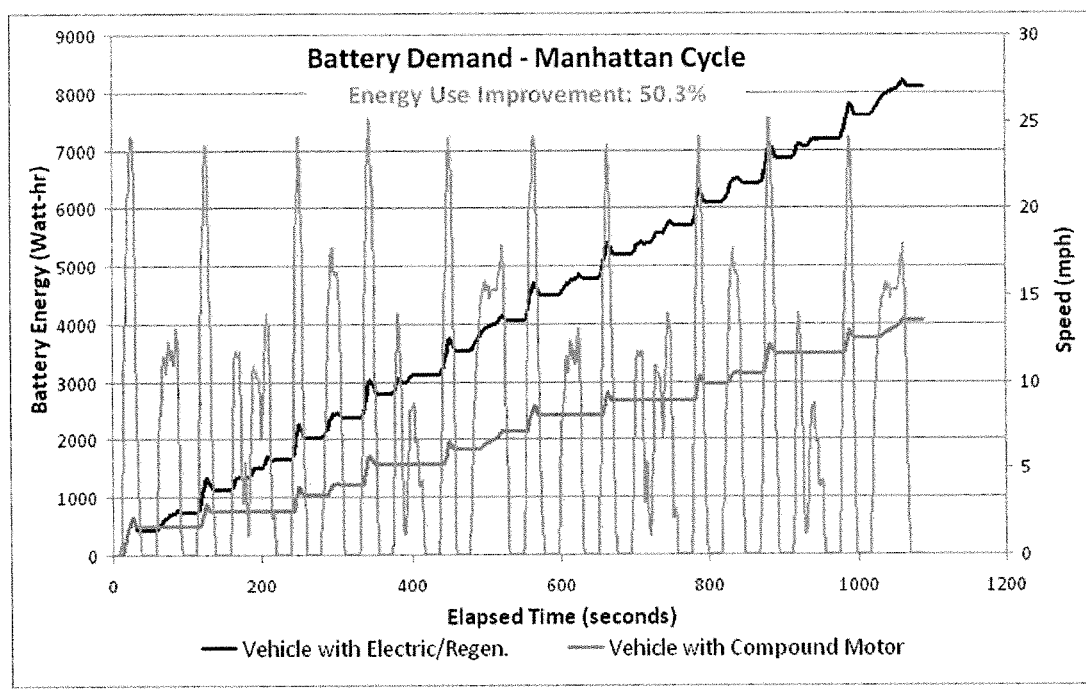

FIG. 8 is a chart of a standardized drive cycle, the Manhattan Bus Drive Cycle, showing the efficiency improvement of a city bus powered by a combined motor over a similar city bus powered by a conventional electric motor of similar power.

Figure 9A:
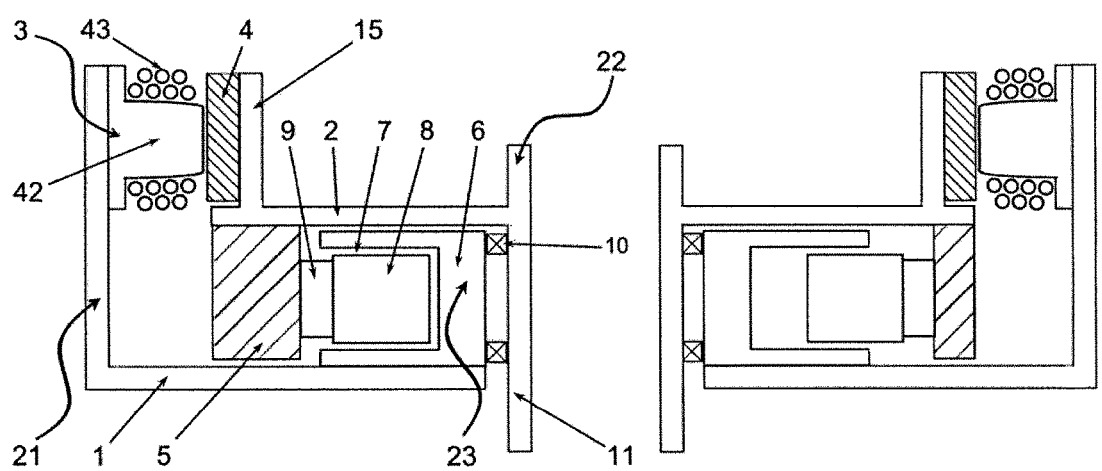
FIGS. 9A and 9B are schematic illustrations of another embodiment of the invention, with the electric motor subsystem stacked adjacent to and non-coplanar with the hydraulic motor subsystem, and the stator and rotor assemblies arranged coaxially to each other.

In a further embodiment of the invention illustrated in FIG. 9A, the hydraulic and electric motor assemblies are stacked adjacent to each other in a coaxial, non-coplanar configuration. The stacked arrangement permits the use and/or integration in the combined motor of an electric motor that is not of the ring-type permanent magnet configuration and so may not be mountable or configurable to surround the hydraulic motor as illustrated in FIGS. 1A and 1B. Such non-ring-type electric motors include but are not limited to induction motors and reluctance motors.

FIG. 9A shows a stacked motor arrangement using a permanent magnet ring-type electric motor stacked above a radial piston ring-cam hydraulic motor, and shows stator assembly 21 and rotor assembly 22 arranged coaxially to each other. Electromagnetic core and windings 3 and hydraulic motor hub assembly 23 are located on common stator structure 1 in a stacked, non-coplanar, fashion; similarly, ring cam 5 and array of permanent magnets 4 are located on common rotor structure 2 in a stacked, non-coplanar fashion.

Figure 9B:
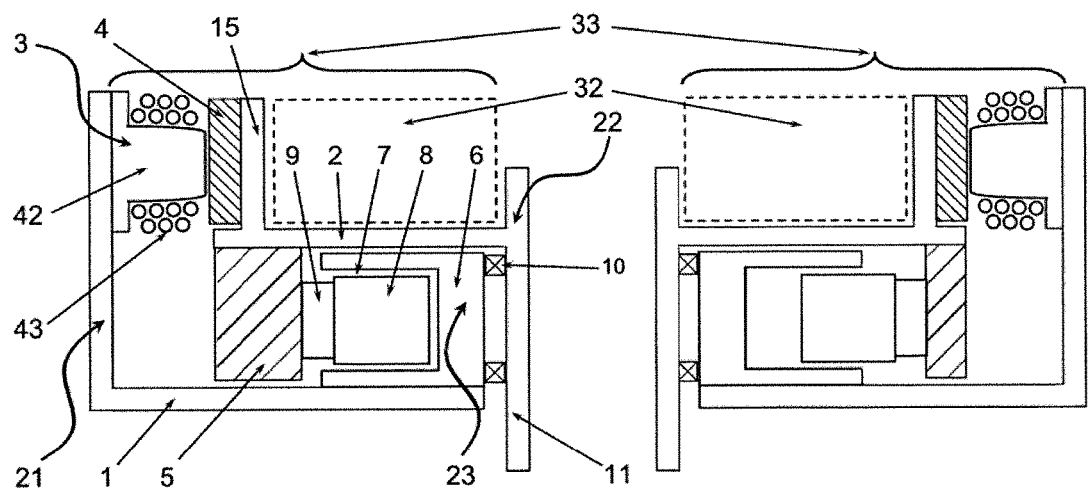

FIG. 9B illustrates area 33, which includes open area 32 and the area occupied by stator core and windings 3, permanent magnets 4 and back iron ring 15, that may be utilized to mount or locate an electric motor subsystem that is not of the ring-type permanent magnet motor configuration and so may not be mountable or configurable to surround the hydraulic motor.

The stacked, non-coplanar configuration may allow multiple electric and hydraulic motor subsystems to be coaxially combined or integrated with each other so as to optimize and maximize the torque and power range of the combined motor.

Hydraulic motors are typically more efficient in lower speed ranges while electric motors are more efficient at higher rotational speeds. In certain applications it may be desirable for the electric motor subsystem to be capable of higher rotational speeds than the hydraulic motor subsystem. In a further embodiment of the invention the electric and hydraulic motor subsystems are arranged coaxially and coplanar to each other, having a common or shared stator assembly but having independently rotating rotors that are rotationally engaged with each other by a power transmission mechanism selected from a group including gear drives and friction drives including differential, ring and pinion, helical and bevel gearsets, single ratio, multiple changeable ratios or continuously variable ratios so that the electric motor rotor can rotate at a faster rotational speed or speeds at either fixed or variable rate than the hydraulic motor rotor.

Figure 10A:
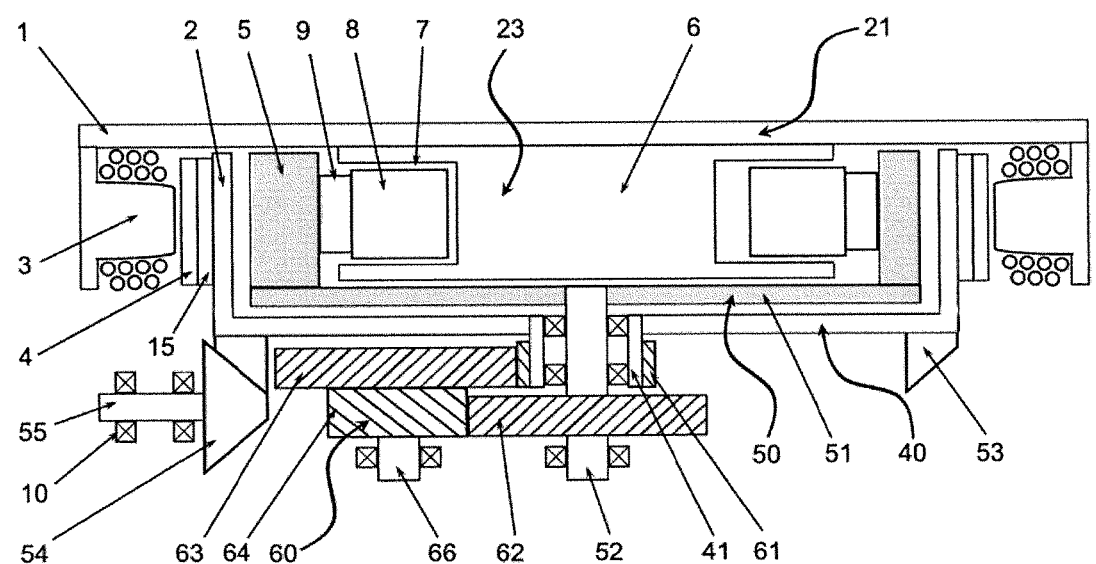
FIG. 10A schematically illustrates an embodiment of the invention in which the electric and hydraulic motor subsystems are arranged coaxially and coplanar to each other, having a common stator assembly but having independently rotating rotors so that the electric motor rotor can rotate at a different rotational speed at either fixed or variable rates from the hydraulic motor rotor.

FIG. 10A is a schematic cross-sectional side view of the hydraulic and electric motor subsystems arranged coaxially and coplanar to each other and having a shared or common stator assembly 21, with electric rotor assembly 40 rotationally engaged with hydraulic rotor assembly 50 by gearset assembly 60. Common stator assembly 21 comprises stator structure 1 to which is affixed hydraulic motor hub assembly 23 and stator core assembly 3. Stator core assembly 3 comprises stator core 42 and coil windings 43. Hydraulic motor hub assembly 23 comprises hydraulic motor hub 6 that includes a radial array of cylinders 7 in which are located pistons 8 each of which is fitted with roller 9. Pistons 8 are pressurized to push outwardly so that rollers 9 rollingly engage convoluted, multiple-lobed inner surface of ring cam 5 to actuate pistons 8 within cylinders 7. Hydraulic motor hub assembly 23 also includes a system of valves and hydraulic fluid passages, not shown, that enable its hydraulic power and pumping functionality. Hydraulic rotor assembly 50 comprises hydraulic rotor endplate 51 to which is affixed ring cam 5 and hydraulic motor shaft 52. Gear 62 is affixed to hydraulic motor shaft 52. Electric rotor assembly 40 comprises electric rotor endplate 2 to which is affixed back iron ring 15. An array of permanent magnets 4 that electromagnetically engages with stator assembly 3, which comprises stator core 42 and coil windings 43, is affixed to back iron ring 15. If electric rotor endplate 2 is manufactured from appropriate ferrous metal then permanent magnets 4 may be affixed directly to electric rotor endplate 2 and back iron ring 15 would not be required. Electric motor shaft 41 is affixed to electric rotor structure 2, and gear 61 is affixed to electric motor shaft 41. Electric rotor shaft 41 is of tubular cross section so that hydraulic rotor shaft 52 may rotatably fit within electric rotor shaft 41, supported by bearings 10. Ring gear 53 is affixed to electric rotor assembly 40 and engages with pinion gear 54 which is affixed to drive shaft 55 that connects to vehicle drivetrain (not shown). Gearset assembly 60 comprises gear 61 affixed to electric rotor shaft 41, gear 62 affixed to hydraulic motor shaft 52, and intermediary gears 63 and 64 which are affixed together and rotatably mounted on gear shaft 66. Gear shaft 66 is affixed to the combined motor housing (not shown).

The rotational drive is transmitted from electric rotor shaft 41 via gear 61 which engages with intermediary gear 63. Gear 63 has a larger diameter than gear 61 and so rotates slower than gear 61. Intermediary gear 63 is affixed to and rotates with gear 64 which engages gear 62. Gear 62 has a larger diameter than gear 64 and so rotates slower than gear 64. Gear 62 is affixed to hydraulic motor shaft 52. If, for example, gear 63 is twice the diameter of gear 61 and gear 62 is twice the diameter of gear 64, then hydraulic rotor shaft 52 will rotate at a quarter of the rotational speed of electric rotor shaft 41.

A disengagement mechanism may be included in the aforementioned gearset or drive transmission or between the electric and hydraulic motor subsystems so that the hydraulic motor subsystem may be disengaged from and reengaged with the electric motor subsystem. The disengagement mechanism may include, but is not limited to, friction and sliding clutches and synchronized gear disengagement mechanisms and may be actuated by various means including mechanical, electric and hydraulic actuation.

Figure 10B:
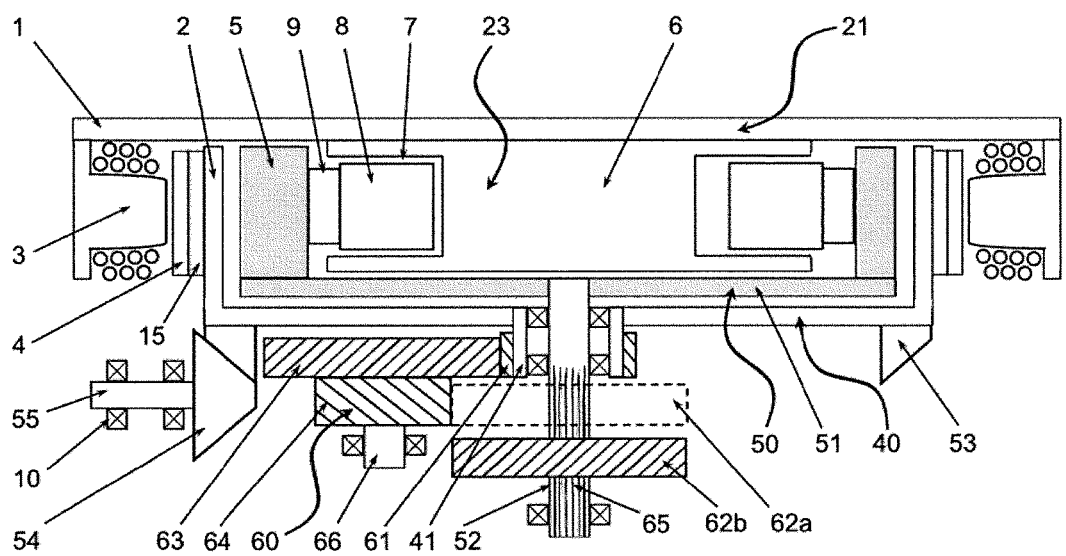
FIG. 10B schematically illustrates an embodiment of the invention in which the electric and hydraulic motor subsystems are arranged coaxially and coplanar to each other, having a common stator assembly but having independently rotating rotors so that the electric motor rotor can rotate at a different rotational speed at either fixed or variable rates from the hydraulic motor rotor. The embodiment includes a disengagement mechanism so that the hydraulic motor subsystem can be disengaged from and reengaged with the electric motor subsystem.

FIG. 10B is a schematic cross-sectional side view of the embodiment depicted in FIG. 10A, with hydraulic motor shaft 52 having a splined section 65, and gear 62b having a correspondingly splined center hole so that it may be moved axially away from gearset assembly 60. Gear 62b is shown in the disengaged position, having been moved axially along splined section 65 from its engaged position depicted by dotted lines 62a, such axial movement of gear 62b effected by a suitable actuation mechanism (not shown).

The independently rotating electric and hydraulic rotors and disengagement mechanisms as described in the aforementioned embodiments are also applicable to the stacked or non-coplanar embodiments of the invention as previously described. The following summarizes the preferred rotor configurations that can be utilized with respect to the combined motor:

Integrated or combined electric and hydraulic rotors: See FIG. 1A. Because the permanent magnets are affixed to the outside of the hydraulic ring cam the electric motor subsystem operates at the same rotational speed as the hydraulic motor subsystem.

Independent electric and hydraulic rotors: See FIGS. 10A and 10B. This rotor embodiment has an electric rotor 40 and an hydraulic rotor 50 that are separate from each other but are rotationally engaged with each other by a power transmission mechanism, such as a gearset 60, so that the electric rotor can rotate at a faster speed, at either fixed or variable rate, than the hydraulic rotor.

Independent and disengageable electric and hydraulic rotors: This rotor embodiment includes a disengagement mechanism that enables the independent electric rotor and hydraulic rotors to be fully disengaged from each other so that either of the rotors may be stopped while the other produces torque.

Figure 11:
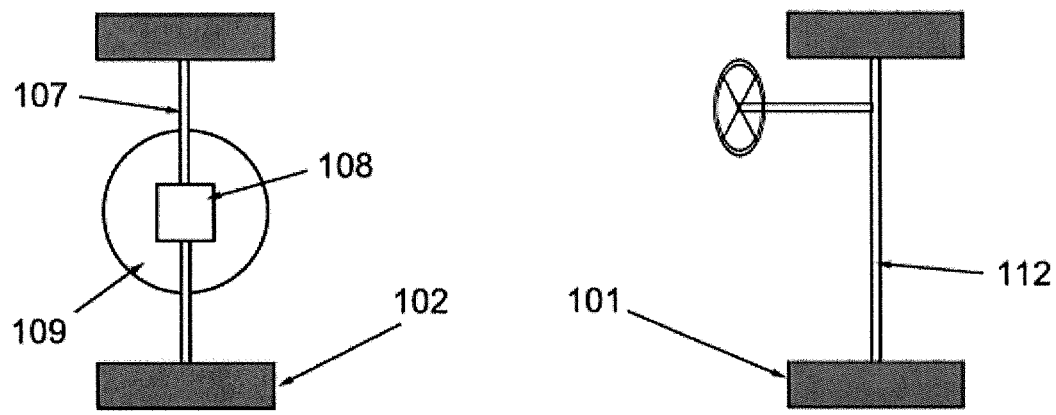
FIG. 11A schematically illustrates a combined motor mounted in a front-wheel-drive vehicle, motor drivingly engaged with the front axle via a right angle gearbox as illustrated in FIG. 3.
FIG. 11B schematically illustrates a combined motor mounted in a rear-wheel-drive vehicle, the motor drivingly engaged with the rear axle via a right angle gearbox as illustrated in FIG. 3.
FIG. 11C schematically illustrates two combined motors mounted in a four-wheel-drive vehicle, the motors drivingly engaged with the front and rear axles via right angle gearboxes as illustrated in FIG. 3.
Figure 11:
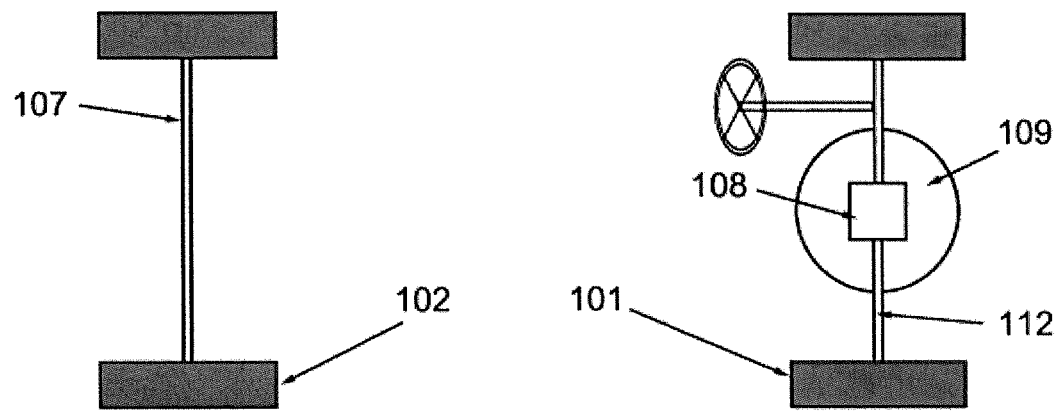
Figure 11:
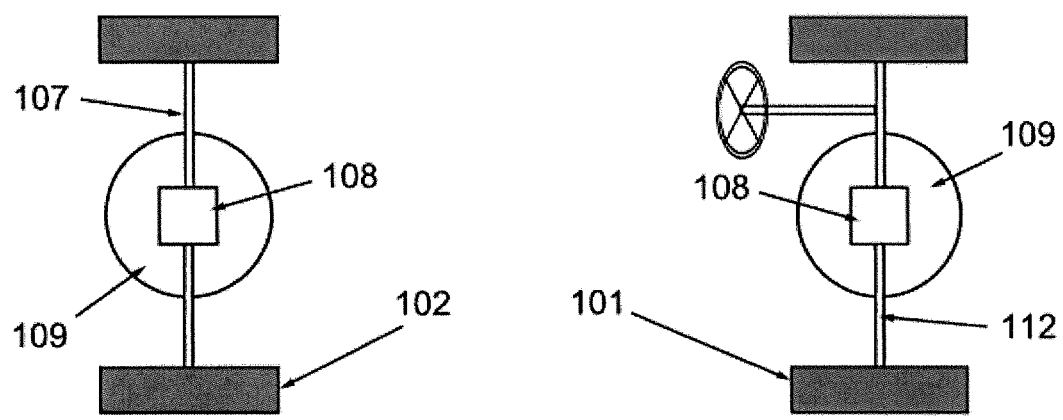

FIGS. 11A, B and C are schematic plan and side views of vehicle layouts that incorporate the combined motor. In each variant the combined motor engages with the driven axle via a right angle gearbox as illustrated in FIG. 3A with shaft 29 drivably connected to the vehicle's driven axle. In FIGS. 11A, 11B and 11C combined motor 109 is drivingly engaged to either rear axle 107 or front axle 112 via right angle gearbox 108. Right angle gearbox 108 includes or incorporates a differential mechanism so that right angle gearbox 108 may engage directly with the driven front axle 107 and/or driven rear axle 112. Right angle gearbox 108 is combined, coupled or integrated above or below combined motor 109 in the manner disclosed in "Kinetic Energy Recovery and Electric Drive for Vehicles", U.S. application Ser. No. 12/808,664, filed Jun. 16, 2010, now U.S. Pat. No. 8,798,828.

Having described and illustrated the principles of the invention in the preferred embodiments thereof it should be apparent that the invention can be modified in arrangement and detail without departing from such principles. We claim all modifications and variations coming within the spirit and scope of the invention. The foregoing description is only exemplary of the principles of the invention. Many modifications and variations of the present invention are possible in light of the above teachings. The preferred and alternative embodiments of this invention have been disclosed, however, so that one of ordinary skill in the art will recognize that certain modifications and variations would come within the scope of this invention.

What is claimed is:

1. A combined electric-hydraulic motor comprising:
an electric motor subsystem including:
a stator assembly;
a rotor assembly including a rotor and an array of permanent magnets affixed to an outer surface of the rotor that electromagnetically engage with the stator assembly; and
a hydraulic motor subsystem including a radial array of pistons, wherein the radial array of pistons is retractable, and wherein the electric motor subsystem and the hydraulic motor subsystem are configured to form a single combined motor, wherein the rotor assembly engages the electric motor subsystem and the hydraulic motor, the rotor assembly including a ring cam for mechanically engaging the radial array of pistons, the ring cam affixed to the array of permanent magnets of the electric motor subsystem; and
a system controller and control valves to regulate pressure to the radial array of pistons to effect retraction and reengagement of the radial array of pistons, the retraction to disengage the hydraulic motor subsystem from the rotor assembly, the system controller actuating the electric motor subsystem when above a predetermined rotational speed, and to engage the hydraulic motor subsystem to the rotor assembly when below the predetermined rotational speed so as to substitute high-efficiency hydraulic torque for low efficiency electric torque.

2. The combined electric-hydraulic motor of claim 1 in which the electric motor subsystem is arranged coaxially to the hydraulic motor subsystem.

3. The combined electric-hydraulic motor of claim 1 in which the electric motor subsystem is arranged coplanar to the hydraulic motor subsystem.

4. The combined electric-hydraulic motor of claim 1 in which the electric motor subsystem rotor assembly is rotationally engaged with the hydraulic motor subsystem rotor assembly.

5. The combined electric-hydraulic motor of claim 4 in which the rotor assemblies are rotationally engaged by a power transmission mechanism.

6. The combined electric-hydraulic motor of claim 1 in which the electric motor subsystem includes a ring motor.

7. The combined electric-hydraulic motor of claim 1 in which the electric motor subsystem includes a brushless, permanent magnet motor.

8. The combined electric-hydraulic motor of claim 1 in which the hydraulic motor subsystem includes a radial piston ring cam motor.

9. The combined electric-hydraulic motor of claim 1 including a hydraulic energy storage system including an accumulator for storing brake energy recovered during start-and-stop drive cycles of the hydraulic motor subsystem.

10. The combined electric-hydraulic motor of claim 1 in which the system controller is operative to manage transitions between the hydraulic motor subsystem and the electric motor subsystem:
by utilizing high efficiency hydraulic torque instead of low efficiency electric torque up to a predetermined rotational speed, then to disengage the hydraulic motor subsystem from torque production above the predetermined rotational speed, and to energize the electric motor above the predetermined rotational speed where electric motors are highly efficient, and
to reengage the hydraulic motor subsystem for torque production below a predetermined rotational speed, and to de-energize the electric motor below the predetermined rotational speed to substitute high efficiency hydraulic torque instead of low efficiency electric torque.

11. The combined electric-hydraulic motor of claim 10 in which the hydraulic motor subsystem includes a hydraulic accumulator in which hydraulic pressure stored in the accumulator energizes the hydraulic motor subsystem to substitute for the electric motor subsystem.

* * * * *